United States Patent
An et al.

(10) Patent No.: US 12,528,544 B2
(45) Date of Patent: Jan. 20, 2026

(54) FLOOR STRUCTURE FOR ELECTRIC VEHICLE

(71) Applicants: Hyundai Motor Company, Seoul (KR); Kia Corporation, Seoul (KR)

(72) Inventors: Byeongdo An, Anyang-si (KR); Mun Soo Cha, Suwon-si (KR); Heedae Oh, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 400 days.

(21) Appl. No.: 18/314,912

(22) Filed: May 10, 2023

(65) Prior Publication Data
US 2024/0051612 A1    Feb. 15, 2024

(30) Foreign Application Priority Data
Aug. 12, 2022    (KR) .................. 10-2022-0101424

(51) Int. Cl.
B62D 25/20    (2006.01)
B60K 1/04    (2019.01)
B62D 21/15    (2006.01)

(52) U.S. Cl.
CPC ............ B62D 25/2036 (2013.01); B60K 1/04 (2013.01); B62D 21/157 (2013.01); *B60K 2001/0438* (2013.01)

(58) Field of Classification Search
CPC .. B62D 25/025; B62D 25/2036; B62D 25/20; B62D 21/157; B62D 27/065; B60K 1/04; B60K 2001/0438

USPC ...... 296/209, 204, 193.05, 7, 187.12, 29, 30
See application file for complete search history.

(56) References Cited

U.S. PATENT DOCUMENTS 6,053,564 A * 4/2000 Kamata .................. B62D 21/09
296/187.1
2022/0161867 A1* 5/2022 Choi .................. B62D 25/2036

FOREIGN PATENT DOCUMENTS

JP         4114454 B2 *  7/2008
KR    20150019047 A  *  2/2015 ............. B62D 25/20

OTHER PUBLICATIONS

JP4114454 Text (Year: 2008).*

* cited by examiner

*Primary Examiner* — Dennis H Pedder
(74) *Attorney, Agent, or Firm* — SLATER MATSIL, LLP

(57) ABSTRACT

An embodiment floor structure for an electric vehicle includes a floor panel connected to a pair of side sills respectively disposed along a front-to-back direction of a vehicle body on a left side and a right side of the vehicle body, each of the side sills including a sill inner member and a sill outer member connected together, a pair of reinforcement members disposed on an inside of each side sill along the front-to-back direction of the vehicle body, and a fastening device engaged to the sill inner member of one of the side sills and to the reinforcement member on a same side of the vehicle body as the one of the side sills.

16 Claims, 10 Drawing Sheets

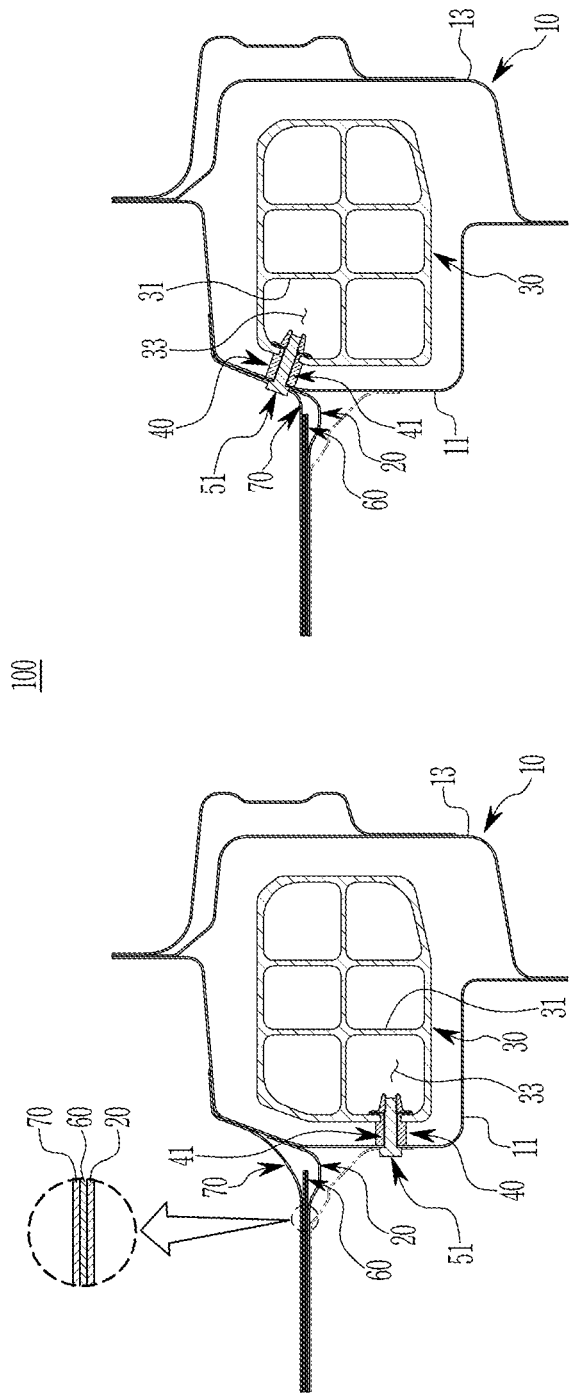

FLOOR STRUCTURE FOR ELECTRIC VEHICLE

CROSS-REFERENCE TO RELATED APPLICATIONS

This application claims the benefit of Korean Patent Application No. 10-2022-0101424, filed on Aug. 12, 2022, which application is hereby incorporated herein by reference.

TECHNICAL FIELD

The present invention relates to a vehicle body structure for an electric vehicle.

BACKGROUND

Due to recently strengthened environmental regulations and fuel efficiency regulations, the use of an electric vehicle driven by an electric driving source is increasing.

An electric vehicle is equipped with a battery assembly that supplies electricity to an electric drive source. The battery assembly is mounted on the lower part of the center floor structure in the vehicle body of an electric vehicle, for example.

In order to increase the capacity of the battery assembly while securing a wide indoor space, a flat type center floor structure in which the tunnel portion is omitted and the height of the cross-section is reduced is applied to such an electric vehicle.

However, the flat type center floor structure is disadvantageous in terms of rigidity due to an increase in parts of an electric driving source, an increase in a wheel base, and mounting of a seat and a battery assembly, and may cause excessive vibration.

Furthermore, such a center floor structure may cause damage to the battery assembly and damage to the occupant due to rotational deformation of the side sill as the crash load is concentrated on the side of the side sill during a side collision.

The above information disclosed in this background section is only for enhancement of understanding of the background of embodiments of the invention, and therefore it may contain information that does not form the prior art that is already to a person of ordinary skill in the art.

SUMMARY

The present invention relates to a vehicle body structure for an electric vehicle. Particular embodiments relate to a floor structure for an electric vehicle on which a seat and a battery assembly are to be mounted.

Embodiments of the present invention provide a floor structure for an electric vehicle capable of minimizing vibration generation, reinforcing the strength of a vehicle body, and improving side impact performance.

A floor structure for an electric vehicle according to an exemplary embodiment of the present invention may include a floor panel connected to side sills including a sill inner member and a sill outer member connected together, and respectively disposed along front and rear directions of a vehicle body on both sides along the vehicle width direction, a reinforcement member disposed on an inside of each side sill along the front and rear directions of the vehicle body, and a fastening unit engaged to the sill inner member of each side sill and the reinforcement member.

The fastening unit may engage an upper portion of the sill inner member and an upper portion of the reinforcement member.

The fastening unit may engage a lower portion of the sill inner member and a lower portion of the reinforcement member.

The fastening unit may include a blind nut that penetrates the sill inner member and is connected to the reinforcement member and an engage bolt that engages the blind nut.

The blind nut may include a bolt connection portion disposed between an inner surface of the sill inner member and the reinforcement member and connected to a penetration hole formed in the sill inner member, a bending part extended from the bolt connection portion and inserted and fitted to the reinforcement member, and a bolt engage part that extends from the bending part.

The reinforcement member may include a plurality of closed sections partitioned by at least one partition and is made of an aluminum extruded material.

The floor panel may be provided in a flat form and may be connected to the sill inner member through both ends along the vehicle width direction.

The floor structure for an electric vehicle according to an exemplary embodiment of the present invention may further include at least one seat cross member connected to an upper surface of the floor panel along the vehicle width direction.

The at least one seat cross member may include a first junction flange portion formed on both sides in the front and rear direction of the vehicle body and connected to the upper surface of the floor panel and at least one first forming part formed between each first junction flange portion.

The floor structure for an electric vehicle according to an exemplary embodiment of the present invention may further include a seat mounting bracket connected to the upper surface of the at least one seat cross member and the sill inner member.

The seat mounting bracket may include a second junction flange portion formed on both sides in the front and rear direction of the vehicle body and connected to the at least one seat cross member, at least one second forming part formed between each second junction flange portion, and a third junction flange portion extended from at least one second forming part and each second junction flange portion and connected to the sill inner member.

The fastening unit may form a load path connected to the reinforcement member through the at least one seat cross member, the seat mounting bracket, and the sill inner member.

The battery assembly may be mounted on the lower part of the floor panel, and the battery assembly may be mounted on the lower portion of the sill inner member and the lower portion of the reinforcement member through a battery mounting unit.

The battery mounting unit may include a bolt support portion formed on a side flange portion provided on both sides along the vehicle width direction of the battery assembly, a support bracket connected to the inner surface of the lower portion of the sill inner member and engaged to the reinforcement member, a pipe nut fixed to the support bracket and connected to the bolt support portion, and a mounting bolt that engages the pipe nut through the bolt support portion.

The floor structure for an electric vehicle according to the exemplary embodiments of the present invention can minimize the occurrence of seat vibration while driving the vehicle, reinforce the strength of the vehicle body, and improve side impact performance.

In addition, effects that can be obtained or predicted by the embodiments of the present invention will be directly or implicitly disclosed in the detailed description of the embodiments of the present invention. That is, various effects expected according to embodiments of the present invention will be disclosed within the detailed description to be described later.

BRIEF DESCRIPTION OF THE DRAWINGS

Embodiments herein may be better understood with reference to the following description in conjunction with the accompanying drawings in which like reference numbers indicate the same or functionally similar elements.

FIG. 5A and FIG. 5B are cross-sectional views illustrating fastening of side sills applied to a floor structure for an electric vehicle according to an exemplary embodiment of the present invention.

Figure 1:
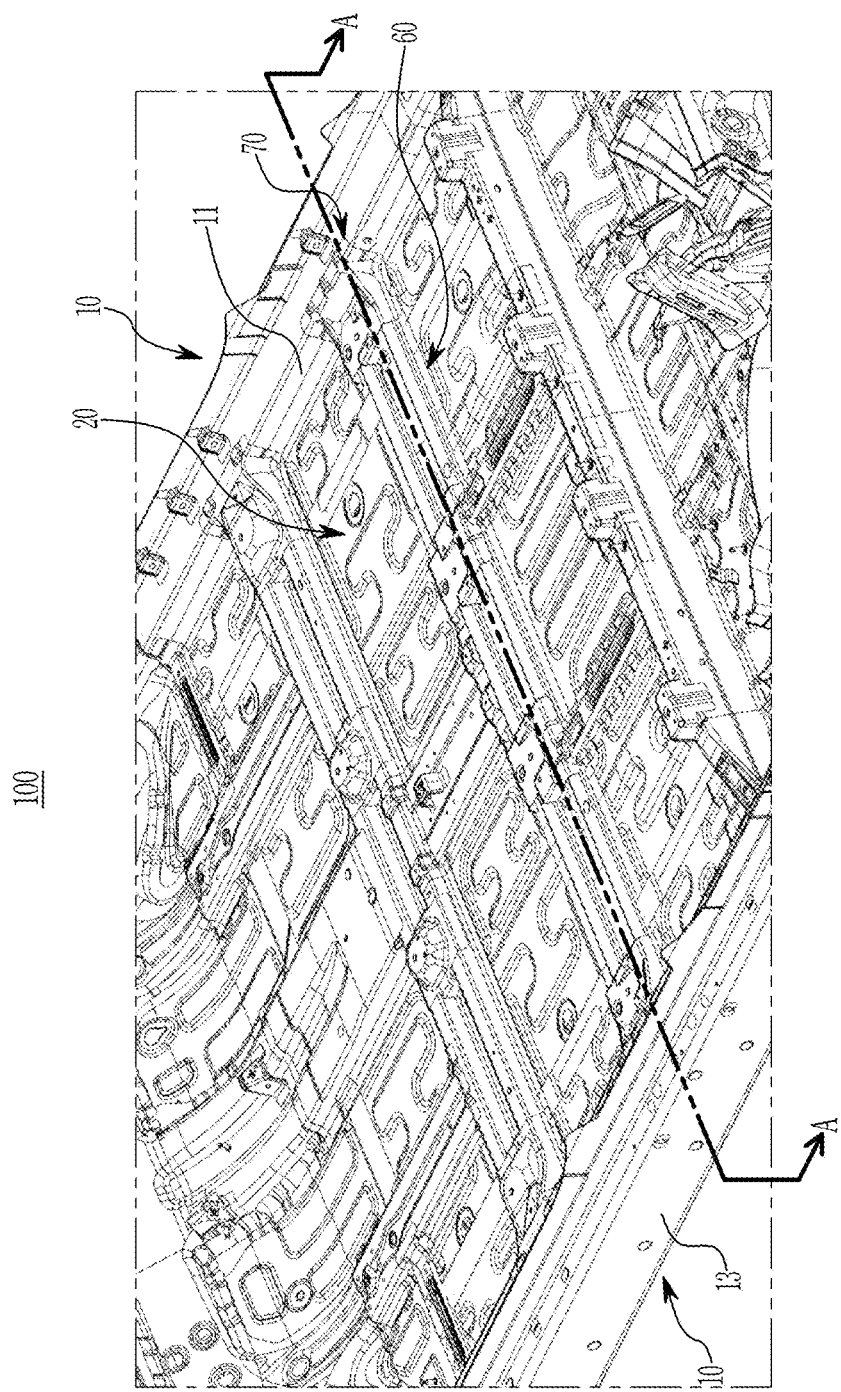
FIG. 1 is a partial perspective view of a floor structure for an electric vehicle viewed from the top according to an exemplary embodiment of the present invention.

The drawings referenced above are not necessarily shown according to scale, but should be understood to present a somewhat brief expression of various preferred features that illustrate the basic principles of embodiments of the present invention. For example, certain design features of embodiments of the present invention, including certain dimensions, directions, positions, and shapes, will be partially determined by specific intended applications and environments.

The following reference identifiers may be used in connection with the accompanying drawings to describe exemplary embodiments of the present disclosure.

| | |
|---|---|
| 1: battery assembly | 3: side flange portion |
| 5: seat | 10: side sill |
| 11: sill inner member | 13: sill outer member |
| 15: penetration hole | 20: floor panel |
| 30: reinforcement member | 31: partition |
| 33: closed section | 35: assemble hall |
| 40: fastening unit | 41: blind nut |
| 43: bolt connection portion | 45: bending part |
| 47: bolt engage part | 51: engage bolt |
| 53: bolt head | 55: bolt rod |
| 60: seat cross member | 61: first junction flange portion |
| 63: first forming part | 65: recess portion |
| 70: seat mounting bracket | 71: second junction flange |
| 73: second forming part | 75: third junction flange portion |
| 77: fourth junction flange portion | 81: load path |
| 90: battery mounting unit | 91: bolt support portion |
| 93: support bracket | 95: pipe nut |
| 97: mounting bolt | 99: screw |
| 100: floor structure for electric vehicle | |

DETAILED DESCRIPTION OF ILLUSTRATIVE EMBODIMENTS

Embodiments of the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

The terms used herein are only for explaining certain embodiments and are not intended to limit the present disclosure.

As used here, the singular forms are also intended to include the plural forms as well, unless the context clearly indicates otherwise.

The terms 'including' and/or 'having' used herein indicate the presence of the specified features, integers, steps, operations, elements, and/or components, but it should also be understood that it does not exclude the existence or addition of one or more other features, integers, steps, operations, components, and/or groups thereof.

As used herein, the term 'and/or' includes any or all combinations of one or more items associated with one or more items listed.

The term 'connected' herein indicates a physical relationship between two components, for example, in which components are directly connected to each other by welding, self piercing rivet (SPR), flow drill screw (FDS), structural adhesive, or the like, or components that are indirectly connected through one or more parameters components.

As used herein, 'vehicle', 'vehicular', 'automotive' or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based purpose build vehicles (PBVs), hydrogen-powered vehicles and other alternative fuel vehicles (e.g., other than petroleum fuel derived from resources).

Hereinafter, embodiments of the present invention will be described in detail with reference to the accompanying drawings.

Figure 2:
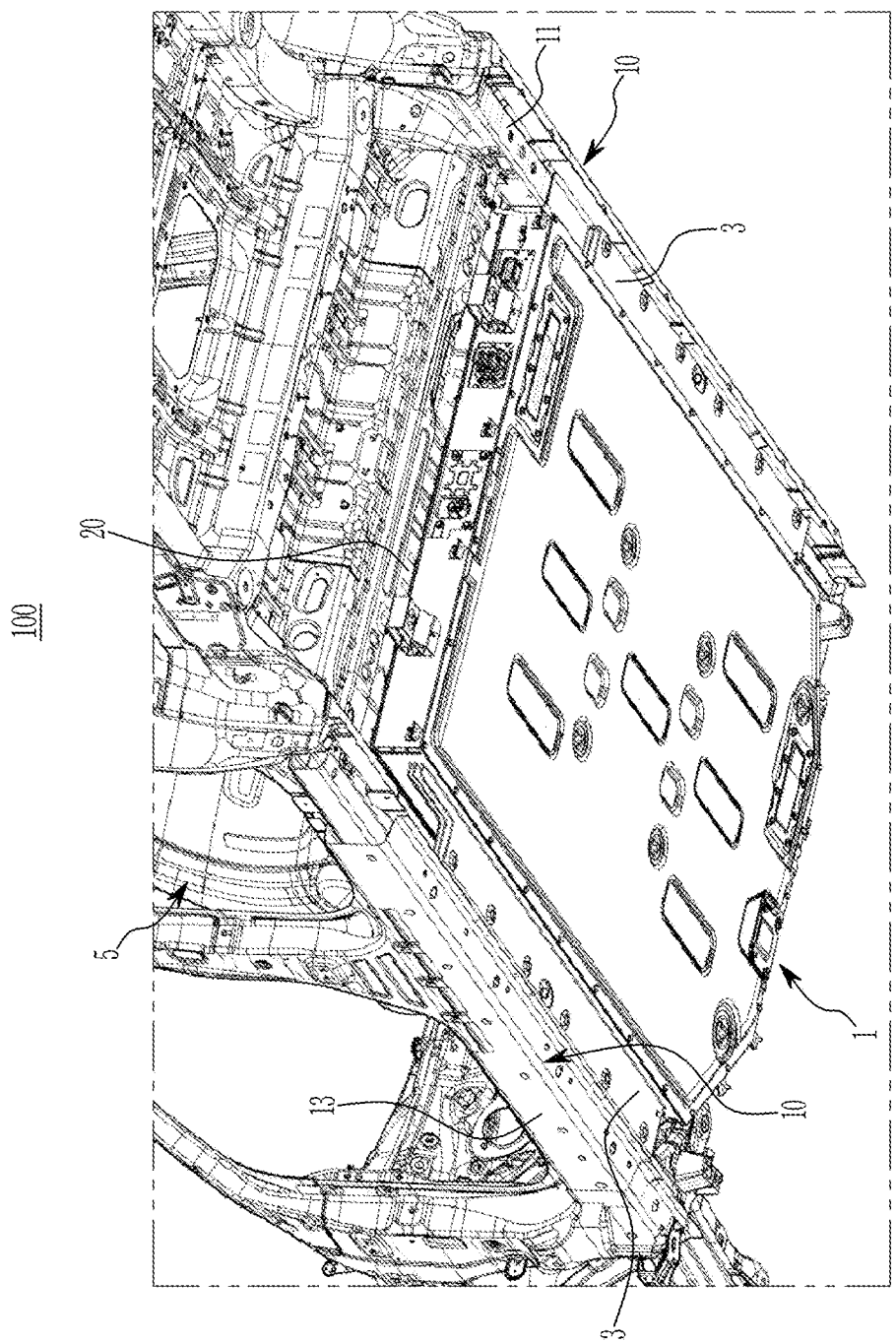
FIG. 2 is a partial perspective view of a floor structure for an electric vehicle viewed from the bottom according to an exemplary embodiment of the present invention.

FIG. 1 is a partial perspective view of a floor structure for an electric vehicle viewed from the top according to an exemplary embodiment of the present invention, and FIG. 2 is a partial perspective view of a floor structure for an electric vehicle viewed from the bottom according to an exemplary embodiment of the present invention.

Referring to FIG. 1 and FIG. 2, a floor structure 100 for an electric vehicle according to an exemplary embodiment of the present invention may be applied to a body of an electric vehicle.

Furthermore, the floor structure 100 for an electric vehicle according to an exemplary embodiment of the present invention may be applied to a center floor structure in a lower vehicle body structure of an electric vehicle.

In this specification, the 'front-to-back direction of the vehicle body' may be defined as the longitudinal direction of the vehicle body, the 'vehicle width direction' may be defined as the left-right direction of the vehicle body, and the 'up-and-down direction' may be defined as the height direction of the vehicle body.

Furthermore, in this specification, 'upper end', 'upper portion', or 'upper surface' of a component indicates an end, portion, or surface of a component that is relatively upper in the drawing, and 'lower end', ' lower portion', or ' lower surface' of a component indicates an end, portion, or surface of a component that is relatively lower in the drawing.

Furthermore, in this specification, an end of a component (e.g., one end or another (other) end, etc.) denotes an end of a component in any one direction, and an end portion of the component (e.g., one end portion or other (another) end portion, etc.) denotes a portion of a component that includes that end.

The floor structure 100 for an electric vehicle according to an exemplary embodiment of the present invention may secure coupling rigidity between at least one seat 5 and a battery assembly 1 and minimize vibration of the at least one seat 5.

Figure 3:
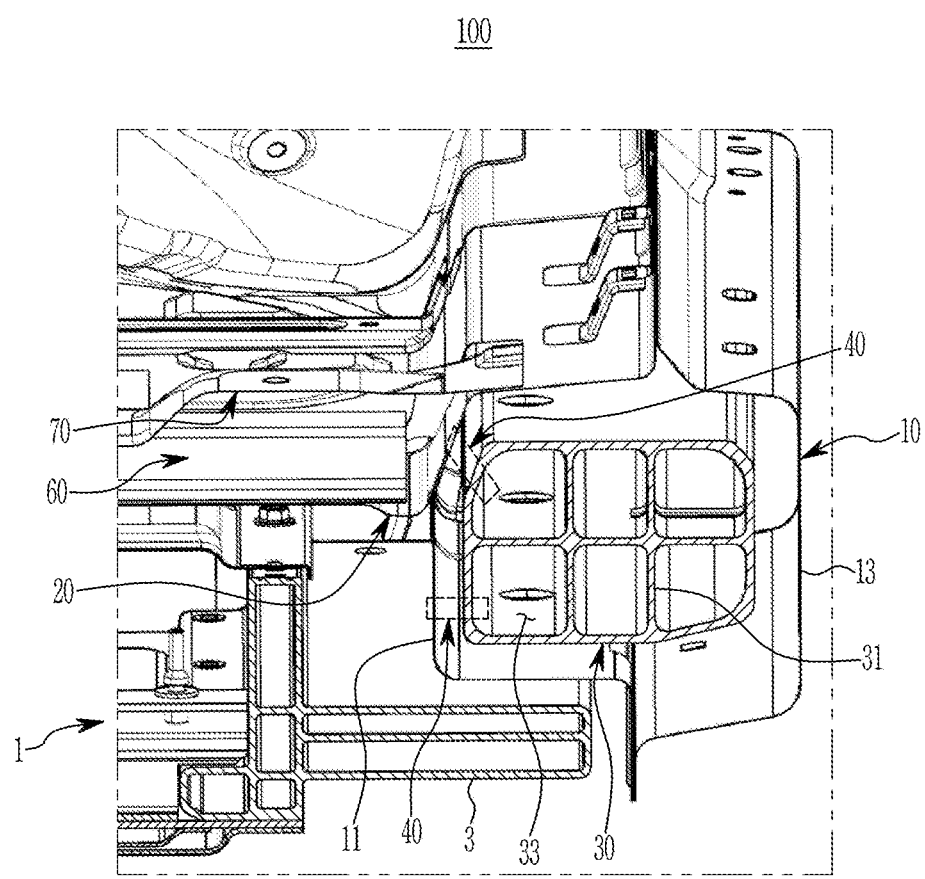
FIG. 3 is a partial cross-sectional view along line A-A in FIG. 1.

FIG. 3 is a partial cross-sectional view along line A-A in FIG. 1.

Referring to FIG. 1 to FIG. 3, the floor structure 100 for the electric vehicle according to an exemplary embodiment of the present invention may include a side sill 10, a floor panel 20, a reinforcement member 30, a fastening unit 40, at least one seat cross member 60, and a seat mounting bracket 70.

The side sill 10 is provided on both sides along the vehicle width direction of the floor structure 100 for an electric vehicle and is disposed along a front-to-back direction of the electric vehicle.

Each side sill 10 includes a sill inner member 11 and a sill outer member 13 of steel material connected together.

Each of the side sills 10 may include an inner space formed between the sill inner member 11 and the sill outer member 13 connected to each other along the front-to-back direction of the vehicle body.

In an exemplary embodiment of the present invention, the floor panel 20 may be, in one example, a center floor panel.

In another example, the floor panel 20 may have a flat shape in which a tunnel portion is omitted.

The floor panel 20 is connected, for example, welded, to the sill inner member 11 of each side sill 10 through both ends along the vehicle width direction.

Both ends of the floor panel 20 may be formed of a joint flange bent in an upward direction.

In an exemplary embodiment of the present invention, the reinforcement members are configured to reinforce the strength of each side sill 10.

The reinforcement members 30 support the impact load in the event of a side impact of an electric vehicle and protects the vehicle's cabin.

The reinforcement members 30 are disposed in the inner space of each side sill 10 along the front-to-back direction of the vehicle body.

The combined structure of the reinforcement members 30 and each side sill 10 will be described in more detail later.

Here, the reinforcement members 30 may be provided with an extruded aluminum material known to a person of an ordinary skill in the art.

In one example, the reinforcement members 30 may have a rectangular cross-section shape.

Furthermore, each of the reinforcement members 30 includes a plurality of closed sections 33 partitioned by at least one partition 31.

Each of the plurality of closed sections 33 may be formed along the front-to-back direction of the vehicle body by at least one partition 31.

In an exemplary embodiment of the present invention, the fastening units 40 (directly or indirectly) connect the sill inner member 11 of each side sill 11 and the reinforcement members 30.

Each of the fastening units 40 is engaged to respective ones of the sill inner member 11 and the reinforcement member 30.

Each of the fastening units 40 may be provided in plural.

Figure 4:
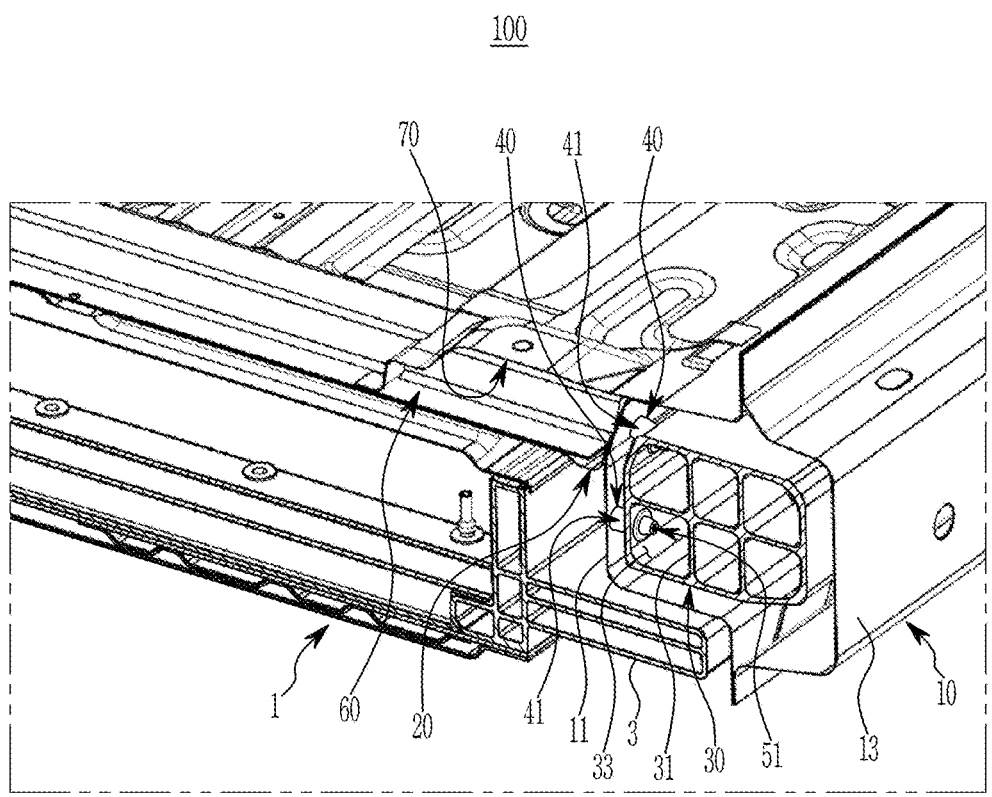
FIG. 4 is a partial cross-section perspective view along line A-A in FIG. 1.
Figure 6C:
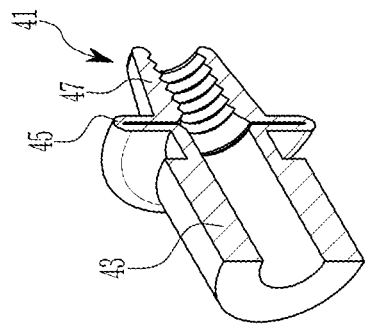
FIG. 6A, FIG. 6B and FIG. 6C are cross-sectional views of a fastening unit applied to a floor structure for an electric vehicle according to an exemplary embodiment of the present invention.
Figure 6B:
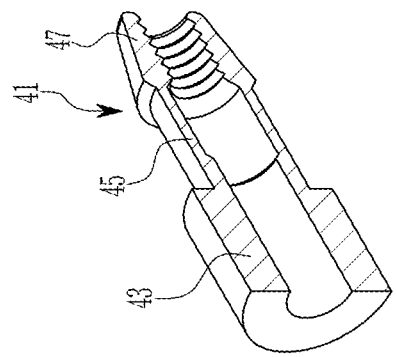
Figure 6A:
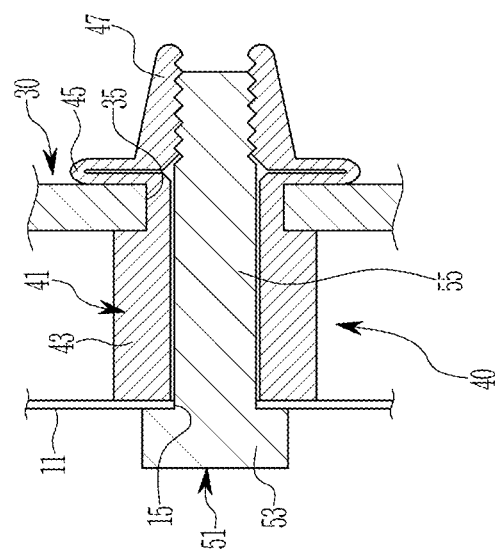

FIG. 4 is a partial cross-section perspective view along line A-A in FIG. 1, FIG. 5A and FIG. 5B are cross-sectional views illustrating fastening of side sills applied to a floor structure for an electric vehicle according to an exemplary embodiment of the present invention, and FIG. 6A, FIG. 6B and FIG. 6C are cross-sectional views of a fastening unit applied to a floor structure for an electric vehicle according to an exemplary embodiment of the present invention.

Referring to FIG. 4 to FIG. 6C, the fastening unit 40 according to an exemplary embodiment of the present invention may be fastened to an upper portion of the sill inner member 11 and an upper portion of the reinforcing member 30.

In addition, the fastening unit 40 may be engaged to a lower portion of the sill inner member 11 and a lower portion of the reinforcement member 30.

In one example, the fastening unit 40 may be provided in plurality.

A plurality of fastening units 40 may be disposed on the upper and lower sides of the floor panel 20 on the side of at least one seat cross member 60.

Furthermore, such a plurality of fastening units 40 may be offset and disposed along the front-to-back direction of the vehicle body.

This fastening unit 40 includes a blind nut 41 and an engage bolt 51.

The blind nut 41 passes through the sill inner member 11 and is connected to the reinforcement member 30.

The engage bolt 51 engages the blind nut 41.

The blind nut 41 may be provided in the form of a hollow pipe.

The blind nut 41 includes an integrally formed bolt connection portion 43, a bending part 45, and a bolt engage part 47.

The bolt connection portion 43 (commonly referred to as a "matching portion" by a person of an ordinary skill in the art) is the portion through which the engage bolt 51 passes.

The bolt connection portion 43 is disposed between the inner surface of the sill inner member n and the reinforcement member 30 in the inner space of each side sill 10.

The bolt connection portion 43 supports the inner surface of the sill inner member n and the outer surface of the reinforcement member 30 at a position corresponding to the inner surface of the sill inner member 11.

The bolt connection portion 43 is connected to the penetration hole 15 formed in the sill inner member 11.

The bending part 45 (commonly referred to as a 'pre-assembling part' or 'weak part' by a person of an ordinary skill in the art) is a part with relatively weak strength and may be deformed by external force.

The bending part 45 extends from the bolt connection portion 43 and is inserted and fitted into an assemble hall 35 of the reinforcement member 30 together with the bolt engage part 47 and may be assembled in advance.

The bolt engage part 47 (commonly referred to as a 'nut part' by a person of an ordinary skill in the art) is inserted into the assemble hall 35 of the reinforcement member 30 together with the bending part 45 and may be disposed to one of a plurality of closed sections 33.

Screw threads are formed on the inner circumferential surface of the bolt engage part 47.

Then, the engage bolt 51 penetrates the bolt connection portion 43 and the bending part 45 and engages the bolt engage part 47 (e.g., by screw coupling).

The engage bolt 51 includes a bolt head 53 and a bolt rod 55.

The bolt head 53 supports the edge portion of the penetration hole 15 of the sill inner member 11 and the bolt connection portion 43.

The bolt rod 55 may be engaged with the bolt engage part 47 through a screw formed at the end.

Here, the engage bolt 51 penetrates the bolt connection portion 43 and the bending part 45 to engage the bolt engage part 47.

Then, the bending part 45 comes into contact with the edge part of the assemble hall of the reinforcing member 30 while being bent (e.g., expanded and deformed) by the engagement force.

Accordingly, the blind nut 41 and the engage bolt 51 secure a connection force between the sill inner member 11 and the reinforcement member 30 and may connect the sill inner member 11 and the reinforcement member 30.

Referring to FIG. 1, FIG. 2, FIG. 3, and FIG. 4, in an exemplary embodiment of the present invention, the at least one seat cross member 60 is configured to mount the seat 5 to the upper surface of the floor panel 20.

In addition, the at least one seat cross member 60 supports the seat 5 and reduces the vibration of the seat 5 through the floor panel 20.

Figure 7:
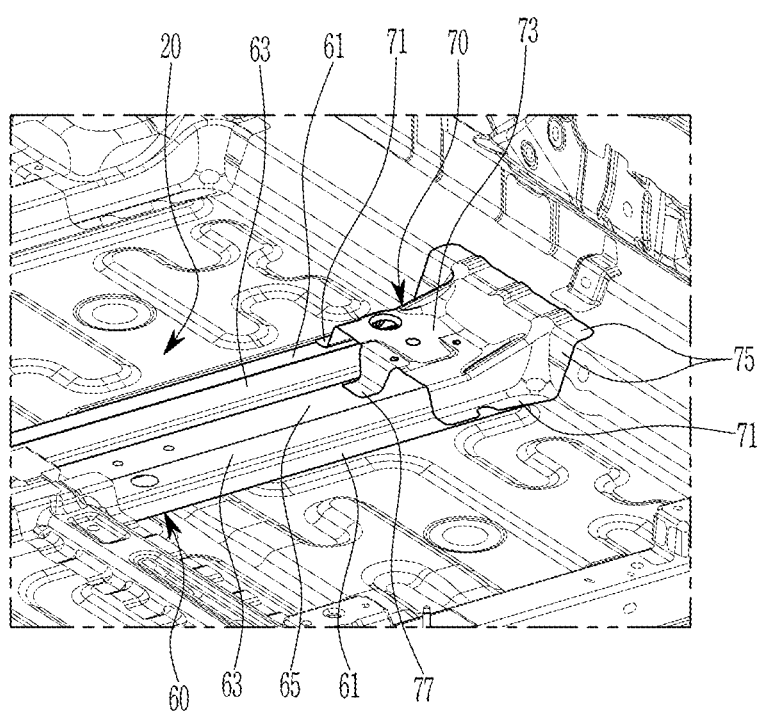
FIG. 7 is a partial perspective view showing a combined structure of a seat cross member and a seat mounting bracket applied to a floor structure for an electric vehicle according to an exemplary embodiment of the present invention.
Figure 8:
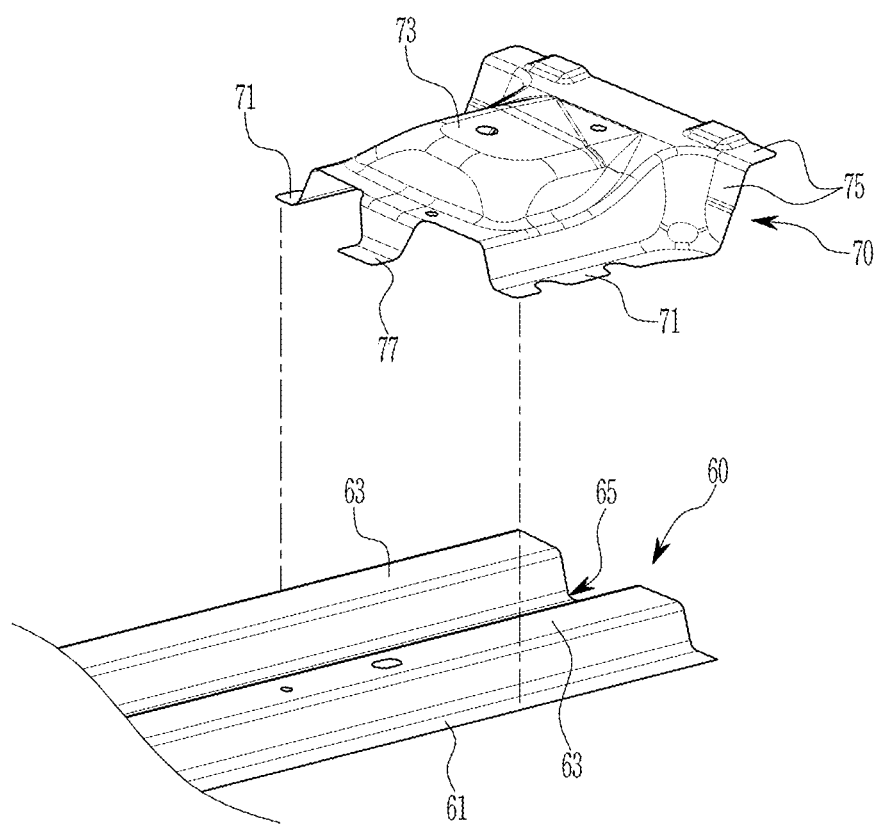
FIG. 8 is a partially exploded perspective view of a seat cross member and a seat mounting bracket applied to a floor structure for an electric vehicle according to an exemplary embodiment of the present invention.

FIG. 7 is a partial perspective view showing a combined structure of a seat cross member and a seat mounting bracket applied to a floor structure for an electric vehicle according to an exemplary embodiment of the present invention, and FIG. 8 is a partially exploded perspective view of a seat cross member and a seat mounting bracket applied to a floor structure for an electric vehicle according to an exemplary embodiment of the present invention.

Referring to FIG. 1 to FIG. 8, the at least one seat cross member 60 is connected (e.g., welded) to the upper surface of the floor panel 20 along the vehicle width direction.

The at least one seat cross member 60 may be connected to each side sill 10 through the floor panel 20.

The at least one seat cross member 60 may also play a role of suppressing deformation along the vertical direction of the floor panel 20, each side sill 10, and each reinforcement member 30.

This at least one seat cross member 60, as shown in FIG. 7 and FIG. 8, includes a first junction flange portion 61 and at least one first forming part 63.

The first junction flange portion 61 is formed on both sides of the vehicle body in the front-to-back direction and is connected (e.g., welded) to the upper surface of the floor panel 20.

The at least one first forming part 63 is configured to reinforce the strength of at least one seat cross member 60.

The at least one first forming part 63 is formed between each first junction flange portion 61.

In one example, the at least one first forming part 63 is provided as a pair along the front and rear direction of the vehicle body and is formed as a shape convexly formed upward.

A recess portion 65 is formed between the pair of first forming parts 63.

In an embodiment of the present invention, the seat mounting bracket 70 is configured to mount the seat 5 to at least one seat cross member 60.

The seat mounting bracket 70 is configured to connect at least one seat cross member 60 and the sill inner member 11.

The seat mounting bracket 70 is configured to suppress deformation of at least one seat cross member 60 and simultaneously reinforce the strength of each side sill 10.

The seat mounting bracket 70 may be connected (e.g., welded) to upper surfaces of both ends of at least one seat cross member 60 and to the sill inner member 11.

This seat mounting bracket 70, as shown in FIG. 7 and FIG. 8, includes a second junction flange portion 71, at least one second forming part 73, and a third junction flange portion 75.

The second junction flange portion 71 is formed on both sides of the seat mounting bracket 70 in the front and rear direction of the vehicle body and is connected to the upper surface of at least one seat cross member 60.

Each of the second junction flange portions 71 may be connected (e.g., welded) to each of the first junction flange portions 61 of the at least one seat cross member 60.

The at least one second forming part 73 is configured to reinforce the strength of the seat mounting bracket 70.

The at least one second forming part 73 is formed between each second junction flange portion 71.

Also, the third junction flange portion 75 extends from at least one second forming part 73 and each second junction flange portion 71 and may be connected (e.g., welded) to the sill inner member 11.

The seat mounting bracket 70 further includes a fourth junction flange portion 77 formed on the opposite side of the third junction flange portion 75.

The fourth junction flange portion 77 extends from at least one second forming part 73 and may be connected (e.g., welded) to the recess portion 65 of at least one seat cross member 60.

On the other hand, in the floor structure 100 for the electric vehicle according to an exemplary embodiment of the present invention, as shown in FIG. 2, the battery assembly 1 may be mounted on the lower part of the floor panel 20.

The battery assembly 1 may be connected to each side sill 10 through side flange portions 3 provided on both sides of the vehicle width direction.

Figure 9:
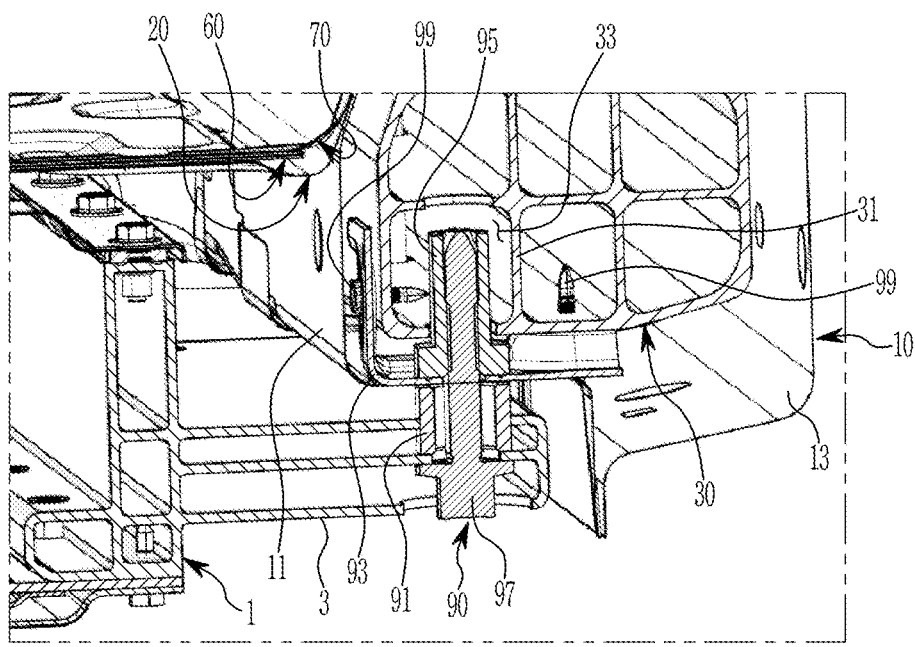
FIG. 9 is a cross-sectional view showing a combination of a battery assembly applied to a floor structure for an electric vehicle according to an exemplary embodiment of the present invention.

FIG. 9 is a cross-sectional view showing a combination of a battery assembly applied to a floor structure for an electric vehicle according to an exemplary embodiment of the present invention.

As shown in FIG. 9, the side flange portion 3 of the battery assembly 1 is connected to the lower portion of the sill inner member 11 and the lower portion of the reinforcement member 30 through the battery mounting unit 90.

In an exemplary embodiment of the present invention, the battery mounting unit 90 includes a bolt support portion 91, a support bracket 93, a pipe nut 95, and a mounting bolt 97.

The bolt support portion 91 is a portion through which the mounting bolt 97 passes and is formed along the vertical direction on the side flange portion 3 of the battery assembly 1.

The support bracket 93 is connected to the inner surface of the lower portion of the sill inner member 11 and is engaged to the reinforcement member 30.

The support bracket 93 may be engaged to the reinforcement member 30 through a plurality of screws 99.

The plurality of screws 99 may be flow drill screws (FDS) known to a person of ordinary skill in the art.

The pipe nut 95 is fixed (e.g., joined or welded) along the vertical direction to the support bracket 93 and is inserted into the reinforcement member 30.

The pipe nut 95 is connected to the bolt support portion 91 through a hole formed in the lower part of the sill inner member 11.

Then, the mounting bolt 97 passes through the bolt support portion 91 and engages the pipe nut 95.

The mounting bolt 97 supports the bolt support portion 91 through the head and may be engaged with the pipe nut 95.

Figure 10A:
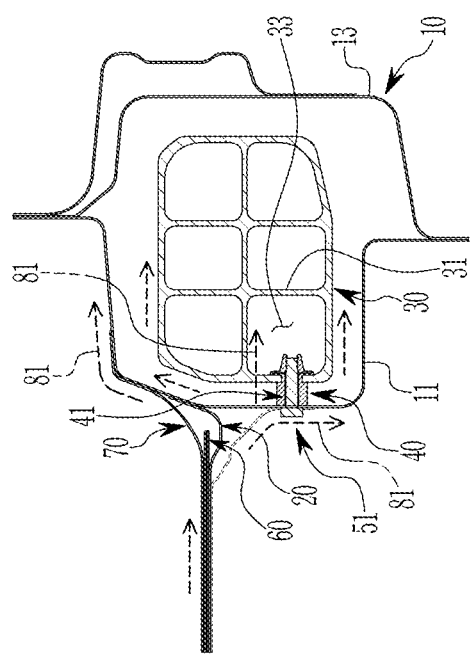
FIG. 10A and FIG. 10B are drawings showing operation of a floor structure for an electric vehicle according to an exemplary embodiment of the present invention.
Figure 10B:
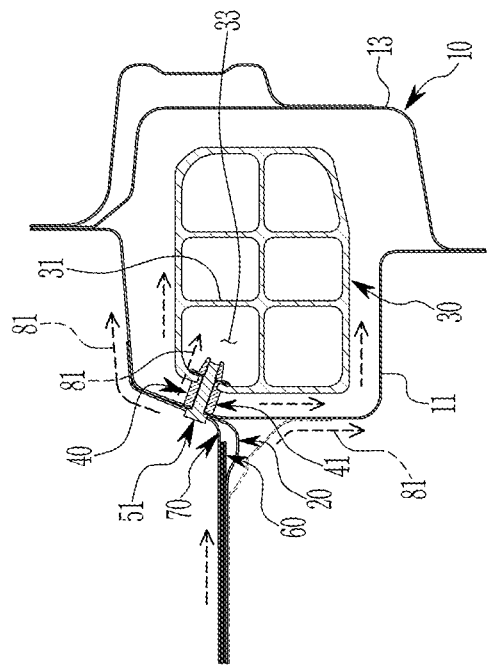

FIG. 10A and FIG. 10B are drawings showing operation of a floor structure for an electric vehicle according to an exemplary embodiment of the present invention.

Hereinafter, the operation of the floor structure 100 for an electric vehicle according to an exemplary embodiment of the present invention will be described in detail referring to FIG. 1 to FIG. 10B.

In an embodiment of the present invention, the sill inner member 11 of the side sill and the reinforcing member 30 are mutually fastened by the blind nut 41 of the fastening unit and the fastening bolt 51.

And at least one seat cross member 60 is connected to the upper surface of the floor panel 20 along the vehicle width direction.

In addition, the seat mounting bracket 70 is connected to the upper surface of both ends of at least one seat cross member 60 and the sill inner member 11.

Therefore, the fastening unit 40 may form a load path 81 connected to the reinforcement member 30 through at least one seat cross member 60, the seat mounting bracket 70, and the sill inner member 11 on the floor panel 20 (see FIG. 10A and FIG. 10B).

That is, the at least one seat cross member 60, the seat mounting bracket 70, the side sill 10, and the reinforcement member 30 may be connected to each other through the fastening unit 40 without being disconnected from each other.

Thus, the floor structure 100 for the electric vehicle according to an exemplary embodiment of the present invention may increase the strength of the input point of the seat 5 mounted on at least one seat cross member 60 and the seat mounting bracket 70.

Accordingly, the floor structure 100 for the electric vehicle according to an exemplary embodiment of the present invention may minimize vibration generation of the seat 5 through the floor panel 20 while driving the electric vehicle.

In addition, the floor structure 100 for the electric vehicle according to an exemplary embodiment of the present invention may improve the connectivity of at least one seat cross member 60, the side sill 10, and the reinforcement member 30, thereby securing the strength of the vehicle body, and may improve the ride comfort of an electric vehicle.

In addition, as the floor structure 100 for the electric vehicle according to an exemplary embodiment of the present invention connects each side sill 10 and the reinforcement members 30, rotation of each side sill 10 may be prevented during a side collision of the electric vehicle.

Therefore, the floor structure 100 for the electric vehicle according to an exemplary embodiment of the present invention may minimize the deformation of the vehicle body due to the side collision of the electric vehicle and may improve the crash safety performance of the electric vehicle by securing the survival space of the occupant.

Furthermore, according to the floor structure 100 for the electric vehicle according to an exemplary embodiment of the present invention, the floor panel 20 of a flat type with a reduced cross-section height may be applied by the connection structure between at least one seat cross member 60 and the reinforcement members 30.

Therefore, in the floor structure 100 for the electric vehicle according to an exemplary embodiment of the present invention, the battery assembly 1 with increased capacity may be mounted on the lower part of the floor panel 20.

Furthermore, according to the floor structure 100 for the electric vehicle according to an exemplary embodiment of the present invention, the battery assembly 1 may be connected to each side sill 10 and the reinforcement members 30 connected to each other through the battery mounting unit 90.

Therefore, the floor structure 100 for the electric vehicle according to an exemplary embodiment of the present invention may minimize damage to the battery assembly 1 due to side collision of the electric vehicle by securing the connection strength of the battery assembly 1.

While embodiments of this invention have been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A floor structure for an electric vehicle, the floor structure comprising:
    a floor panel connected to a pair of side sills respectively disposed along a front-to-back direction of a vehicle body on a left side and a right side of the vehicle body, each of the side sills comprising a sill inner member and a sill outer member connected together;
    a pair of reinforcement members disposed on an inside of each side sill along the front-to-back direction of the vehicle body;
    a fastening device engaged to the sill inner member of one of the side sills and to the reinforcement member on a same side of the vehicle body as the one of the side sills; and
    a battery assembly mounted on a lower part of the floor panel and on a lower portion of each of the sill inner members and a lower portion of each of the reinforcement members through a battery mounting assembly,
    wherein the battery mounting assembly comprises:
        a bolt support portion formed on a side flange portion provided on a side of the battery assembly;
        a support bracket connected to an inner surface of the lower portion of the sill inner member and engaged to one of the reinforcement members;
        a pipe nut fixed to the support bracket and connected to the bolt support portion; and
        a mounting bolt engaged with the pipe nut through the bolt support portion.

2. The floor structure of claim 1, wherein the fastening device engages an upper portion of the sill inner member and an upper portion of the reinforcement member.

3. The floor structure of claim 1, wherein the fastening device engages a lower portion of the sill inner member and a lower portion of the reinforcement member.

4. The floor structure of claim 1, wherein the fastening device comprises:
a blind nut penetrating the sill inner member and connected to the reinforcement member; and
an engage bolt engaged with the blind nut.

5. The floor structure of claim 4, wherein the blind nut comprises:
a bolt connection portion disposed between an inner surface of the sill inner member and the reinforcement member and connected to a penetration hole formed in the sill inner member;
a bending part extended from the bolt connection portion and inserted and fitted to the reinforcement member; and
a bolt engage part that extends from the bending part.

6. The floor structure of claim 1, wherein each of the reinforcement members comprises a plurality of closed sections partitioned by at least one partition and comprises an aluminum extruded material.

7. The floor structure of claim 1, wherein the floor panel has a flat form and is connected to the sill inner members at the left side and the right side of the vehicle body.

8. A floor structure for an electric vehicle, the floor structure comprising:
a floor panel connected to a pair of side sills respectively disposed along a front-to-back direction of a vehicle body on left and right sides of the vehicle body, each of the side sills comprising a sill inner member and a sill outer member connected together;
a pair of reinforcement members disposed on an inside of each side sill along the front-to-back direction of the vehicle body;
a fastening device engaged to the sill inner member of one of the side sills and to one of the reinforcement members on a same side of the vehicle body as the one of the side sills;
a seat cross member extending in a vehicle width direction and connected to an upper surface of the floor panel; and
a seat mounting bracket connected to an upper surface of the seat cross member and the sill inner member,
wherein the seat mounting bracket comprises:
second junction flange portions on both sides in the front-to-back direction of the vehicle body and connected to the seat cross member and connected to the floor panel;
a second forming part between the second junction flange portions; and
a third junction flange portion extended from the second forming part and each of the second junction flange portions and connected to the sill inner member.

9. The floor structure of claim 8, wherein the seat cross member comprises:
first junction flange portions on both sides in the front-to-back direction of the vehicle body and connected to the upper surface of the floor panel; and
a first forming part between the first junction flange portions.

10. The floor structure of claim 8, wherein the fastening device defines a load path connected to the reinforcement member through the seat cross member, the seat mounting bracket, and the sill inner member.

11. An electric vehicle comprising:
a vehicle body comprising a pair of side sills respectively disposed along a front-to-back direction of the vehicle body on a left side and a right side of the vehicle body, each of the side sills comprising a sill inner member and a sill outer member connected together;
a floor panel connected to the side sills;
a pair of reinforcement members disposed on an inside of each side sill along the front-to-back direction of the vehicle body;
fastening devices engaged to the sill inner members and the reinforcement members on the left side and the right side of the vehicle body, respectively; and
a battery assembly mounted on a lower part of the floor panel, the battery assembly comprising side flange portions provided on both sides in a vehicle width direction,
wherein:
the side flange portions are respectively connected to a lower portion of the sill inner members and a lower portion of the reinforcement members, and
the battery mounting assembly further comprises:
a bolt support portion formed on a side flange portion provided on a side of the battery assembly;
a support bracket connected to an inner surface of the lower portion of the sill inner member and engaged to one of the reinforcement members;
a pipe nut fixed to the support bracket and connected to the bolt support portion; and
a mounting bolt engaged with the pipe nut through the bolt support portion.

12. The electric vehicle of claim 11, wherein the fastening devices engage an upper portion of the sill inner member and an upper portion of the reinforcement member on the left side and the right side of the vehicle body, respectively.

13. The electric vehicle of claim 11, wherein the fastening devices engage a lower portion of the sill inner member and a lower portion of the reinforcement member on the left side and the right side of the vehicle body, respectively.

14. The electric vehicle of claim 11, wherein each of the fastening devices comprises:
a blind nut penetrating the sill inner member and connected to the reinforcement member; and
an engage bolt engaged with the blind nut.

15. The electric vehicle of claim 14, wherein the blind nut comprises:
a bolt connection portion disposed between an inner surface of the sill inner member and the reinforcement member and connected to a penetration hole formed in the sill inner member;
a bending part extended from the bolt connection portion and inserted and fitted to the reinforcement member; and
a bolt engage part that extends from the bending part.

16. The electric vehicle of claim 11, wherein each of the reinforcement members comprises a plurality of closed sections partitioned by at least one partition and comprises an aluminum extruded material.

* * * * *